United States Patent
Reznicek

(10) Patent No.: US 10,762,339 B2
(45) Date of Patent: Sep. 1, 2020

(54) AUTOMATIC EMOTION RESPONSE DETECTION

(71) Applicant: ADP, LLC, Roseland, NJ (US)

(72) Inventor: Roberto Reznicek, Porto Alegre (BR)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/131,255

(22) Filed: Sep. 14, 2018

(65) Prior Publication Data
US 2020/0089938 A1 Mar. 19, 2020

(51) Int. Cl.
G06K 9/00 (2006.01)
G10L 15/08 (2006.01)
G10L 25/63 (2013.01)

(52) U.S. Cl.
CPC ..... *G06K 9/00302* (2013.01); *G06K 9/00228* (2013.01); *G06K 9/00771* (2013.01); *G10L 15/08* (2013.01); *G10L 25/63* (2013.01); *G10L 2015/088* (2013.01)

(58) Field of Classification Search
CPC ........... G06K 9/00302; G06K 9/00228; G06K 9/00771; G01L 15/08; G01L 25/63
See application file for complete search history.

(56) References Cited

U.S. PATENT DOCUMENTS

| | | |
|---|---|---|
| 8,219,438 B1 | 7/2012 | Moon et al. |
| 2016/0379225 A1 | 12/2016 | Rider et al. |
| 2018/0081365 A1* | 3/2018 | Asukai ................ B25J 11/0005 |

OTHER PUBLICATIONS

Kasiran et al., "Facial Expression Recognition as an Implicit Customer's Feedback," Intech, Advances in Human-Computer Interaction, Oct. 2008, pp. 189-198.
Subhashini et al., "Analyzing and Detecting Employee's Emotion for Amelioration of Organizations," Procedia Computer Science 48, 2015, pp. 530-536.
Doerrfeld, "20+ Emotion Recognition APIs That Will Leave You Impressed, and Concerned," Nordic APIs, Dec. 31, 2015, accessed Jun. 12, 2018, 7 pages. https://nordicapis.com/20-emotion-recognition-apis-that-will-leave-you-impressed-and-concerned/.
Karadag, "Measurement of Customer Satisfaction through Emotion Analysis in the Banking Sector," EasyChair, Apr. 25, 2018, 5 pages.

* cited by examiner

*Primary Examiner* — Sam Bhattacharya
(74) *Attorney, Agent, or Firm* — Yee & Associates, P.C.

(57) ABSTRACT

A computer-implemented method, system, and computer program product for determining a valence indication, the computer-implemented method comprising: selecting a number of areas, a number of thresholds, a number of points, a number of emotion models, a number of expression models, a number of algorithms; using the number of areas, the number of thresholds, the number of points, the number of emotion models, the number of expression models, and the number of algorithms to form a valence formula; retrieving a video stream from a camera in the particular area in the location; using the video stream, calculating a valence indication for each of a number of individuals having images in the video stream; and wherein the valence indication represents a predominant emotion of a number of individuals at a point in time in the particular area.

20 Claims, 9 Drawing Sheets

AUTOMATIC EMOTION RESPONSE DETECTION

BACKGROUND INFORMATION

1. Field

The present disclosure relates generally to an improved computer system for determining a human reaction to a particular area in a location and, more particularly, to a method and system for calculating a valence indication from visual data or both visual and audio data from security devices.

2. Background

In many commercial areas where people can circulate, there are few ways to detect individual satisfaction with products and services being offered. Many establishments offer "satisfaction machines" near a door so customers can quickly and easily select an indication of how they liked their experience. However, few business have such satisfaction machines. Moreover, only a small number of all customers passing the satisfaction machines actually press buttons on the machines to leave a response. Business owners must rely mostly on intuition and numbers to make decisions. Those decisions may be neither timely nor correct.

Companies may spend a great deal of personal resources including time, money, and computational resources including processor time, memory, and storage usage to attempt to get customer satisfaction information. Such efforts may involve follow-up emails and correspondence, personal interviews, and financial offers for completion of surveys. Such efforts are not only costly in terms of time and resources, but also lack accuracy of a real-time capture of emotional reactions.

Moreover, the real-time capture of the emotional reactions may be of value, not only in terms of marketing and location presentation, but for security applications as well. Real-time identification of agitated or angry individuals in a location may allow intervention before an event occurs with damage to persons or property.

Security cameras provide real-time images of individuals transiting through a location. However, such security cameras require monitoring, and do not give indications of emotions that might lead to destructive behavior.

Therefore, it would be desirable to have a method and an apparatus that take into account at least some of the issues discussed above, as well as other possible issues. For example, it would be desirable to have a method and apparatus that would provide an indication representing a human reaction to a particular area.

SUMMARY

An embodiment of the present disclosure provides a computer-implemented method for determining a valence indication representing a human reaction to a particular area in a location. The computer-implemented method selects a number of areas, a number of thresholds, a number of points, a number of emotion models, a number of expression models, and a number of algorithms. Using the number of areas, the number of thresholds, the number of points, the number of emotion models, the number of expression models, and the number of algorithms, the computer systems forms a valence formula. The computer system retrieves a number of video streams from a number of cameras in the particular area in the location. Using the number of video streams, the computer system calculates a valence indication for each of a number of individuals having images in the video stream. The valence indication represents a predominant emotion of an individual at a point in time in the particular area. The valence indication is calculated using the valence formula.

Another embodiment of the present disclosure provides a computer system for determining a valence indication representing a human reaction to a particular area in a location, the computer system comprising a processor unit and computer-readable instructions stored on a computer-readable medium. The computer-readable instructions are configured to cause the processor unit to: select a number of areas, a number of thresholds, a number of points, a number of emotion models, a number of expression models, a number of algorithms; use the number of areas, the number of thresholds, the number of points, the number of emotion models, the number of expression models, and the number of algorithms to form a valence formula; retrieve a number of video streams from a camera in the particular area in the location; use the number of video streams to calculate a valence indication for each of a number of individuals having images in the number of video streams. The valence indication represents a predominant emotion of an individual at a point in time in the particular area. The valence indication is calculated using the valence formula.

Yet another embodiment of the present disclosure provides a computer program product for determining a valence indication representing a human reaction to a particular area in a location. The computer program product comprises computer-readable instructions stored on a computer-readable medium and configured to cause a processor unit to select a number of areas, a number of thresholds, a number of points, a number of emotion models, a number of expression models, and a number of algorithms; use the number of areas, the number of thresholds, the number of points, the number of emotion models, the number of expression models, and the number of algorithms, to form a valence formula; retrieve a number of video streams from a number of cameras in the particular area in the location; use the number of video streams to calculate a valence indication for each of a number of individuals having images in the number of video streams. The valence indication represents a predominant emotion of an individual at a point in time in the particular area. The valence indication is calculated using the valence formula.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
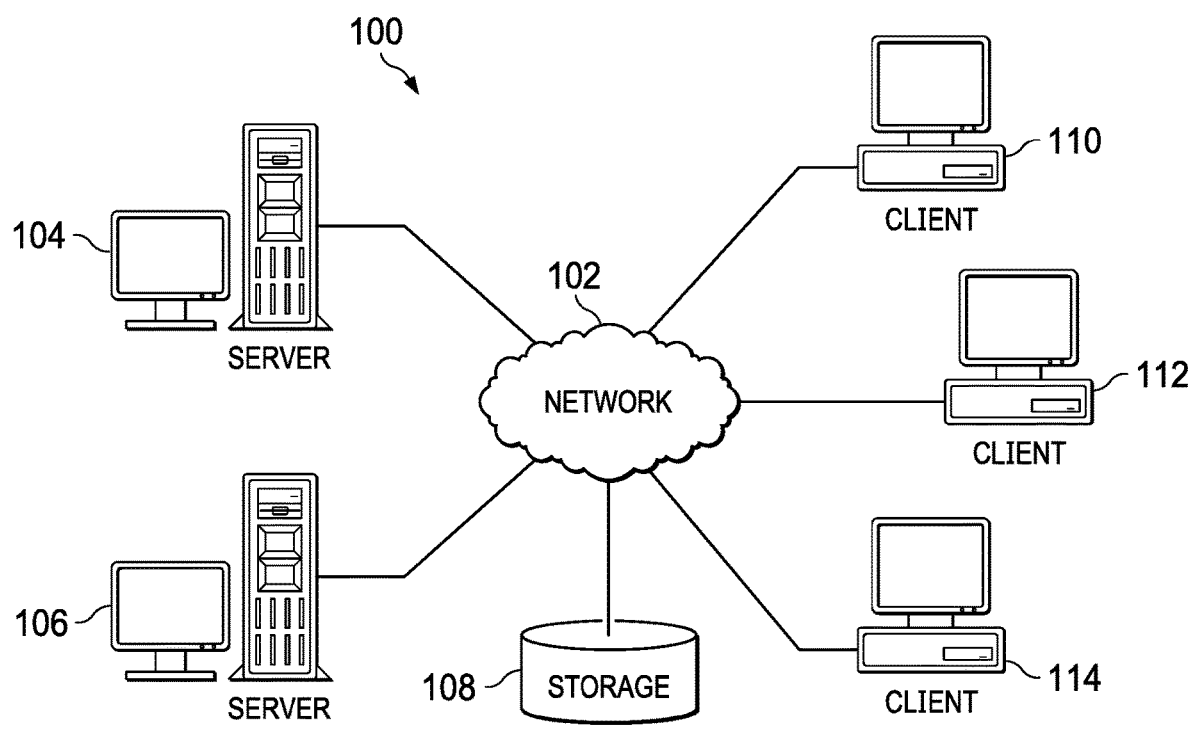
FIG. 1 is an illustration of a data processing environment in accordance with an illustrative embodiment.

The illustrative embodiments recognize and take into account that emotion detection algorithms may be applied to images collected from cameras in a commercial setting, and that the emotion detection algorithms may detect how satisfied the customers and employees are with products and services offered.

The illustrative embodiments recognize and take into account that a business owner may get immediate feedback from changes made to a business environment so that actions may be taken to improve the environment if needed based on the feedback. Such feedback may be obtained by using a computer system that can analyze video streams or both video streams and audio streams in real-time.

The illustrative embodiments recognize and take into account that emotion detection algorithms are available from many different sources. The illustrative embodiments further recognize and take into account that many business establishments are observed twenty-four hours a day by video cameras and video and audio devices for security reasons.

As used herein, the term "valence indication" shall mean a numerical value representing a position on a scale of emotional responses to an area, the scale of emotional responses running from a most positive response to a most negative response.

As used herein, the term "valence formula" shall mean a sum of emotional scores for a first data set and a second data set. When a third data set is determined from audio stream data, the valence formula shall be a sum of emotional scores for a first data set, a second data set, and a third data set.

In an illustrative embodiment, emotion detection algorithms are applied to data from video cameras spread among sections of an establishment in order to automatically determine a customer satisfaction level.

In an illustrative embodiment, a store with cameras pointing to its different sections may detect that customers appear happy when they enter the store. Such a customer emotional reactions may indicate that decoration, organization, and store attendants are working well. As the customers circulate throughout the location, one or more customers may be excited by a specific spot. Such a reaction may give hints that a sales approach is working. In the illustrative embodiment, some customers may appear indifferent, which may indicate that different products should be presented or that a visual change must be employed. Furthermore, the customers may also be detected to show frequent anger or annoyance every time they enter a particular area, which may indicate that attendants are not being supportive or that the attendants are unprepared to deal with the product or service being offered in the area.

In an illustrative embodiment, a valence indication representing a human reaction to a particular area in a location is determined by selecting a number of areas, a number of thresholds, a number of points, a number of emotion models, a number of expression models, and a number of algorithms. The number of areas, the number of thresholds, the number of points, the number of emotion models, the number of expression models, and the number of algorithms are used to form a valence formula. A number of video streams are retrieved from a number of cameras in the particular area in the location. Using the number of video streams, a valence indication is calculated for each of a number of individuals having images in the video stream. The valence indication represents a predominant emotion of an individual at a point in time in the particular area. The valence indication is calculated using the valence formula.

Thus, in one illustrative embodiment, one or more technical solutions are present that overcome a technical problem in an area of determining customer satisfaction as well as providing security by determining a valence indication from a video stream from cameras in a location. The illustrative embodiment enables real-time feedback regarding emotions of individuals in the location and thus is faster than current systems and methods, and saves time and reduces resources necessary to obtain customer feedback by conventional methods such as interviewing customers or mailing questions to the customers. Moreover, such real-time feedback provides more accurate feedback since it is in real-time and based on an observation of the customers at an initial contact with the area in the location.

As used herein, "resources" shall mean one or more of the following: (1) the amount of time to, (2) the amount of processor time and internet bandwidth used to, (3) the amount of memory and storage required for, and (4) the amount of time or processor time to prepare one or both of a validated address and a validated address list. Reduction in the processor time may be a reduction in an amount of time that processor unit 1004 in FIG. 10 spends executing instructions for one or more functional components in FIG. 2 and for executing instructions for processes set forth in FIG. 5 through FIG. 9 compared to current methods of identifying customer reactions and providing security in a location. The reduction in memory and storage may be the reduction in an amount of memory and storage in memory 1006 and persistent storage 1008 in FIG. 10 compared to current methods of determining a human reaction to a particular area. Moreover, the reductions in storage may be the reductions in program code 1024, computer-readable storage media 1026, and computer-readable signal media 1028 in FIG. 10.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

In the illustrative examples, the same reference numeral may be used in more than one figure. This reuse of a reference numeral in different figures represents the same element in the different figures.

With reference now to the figures and, in particular, with reference to FIG. 1, an illustration of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
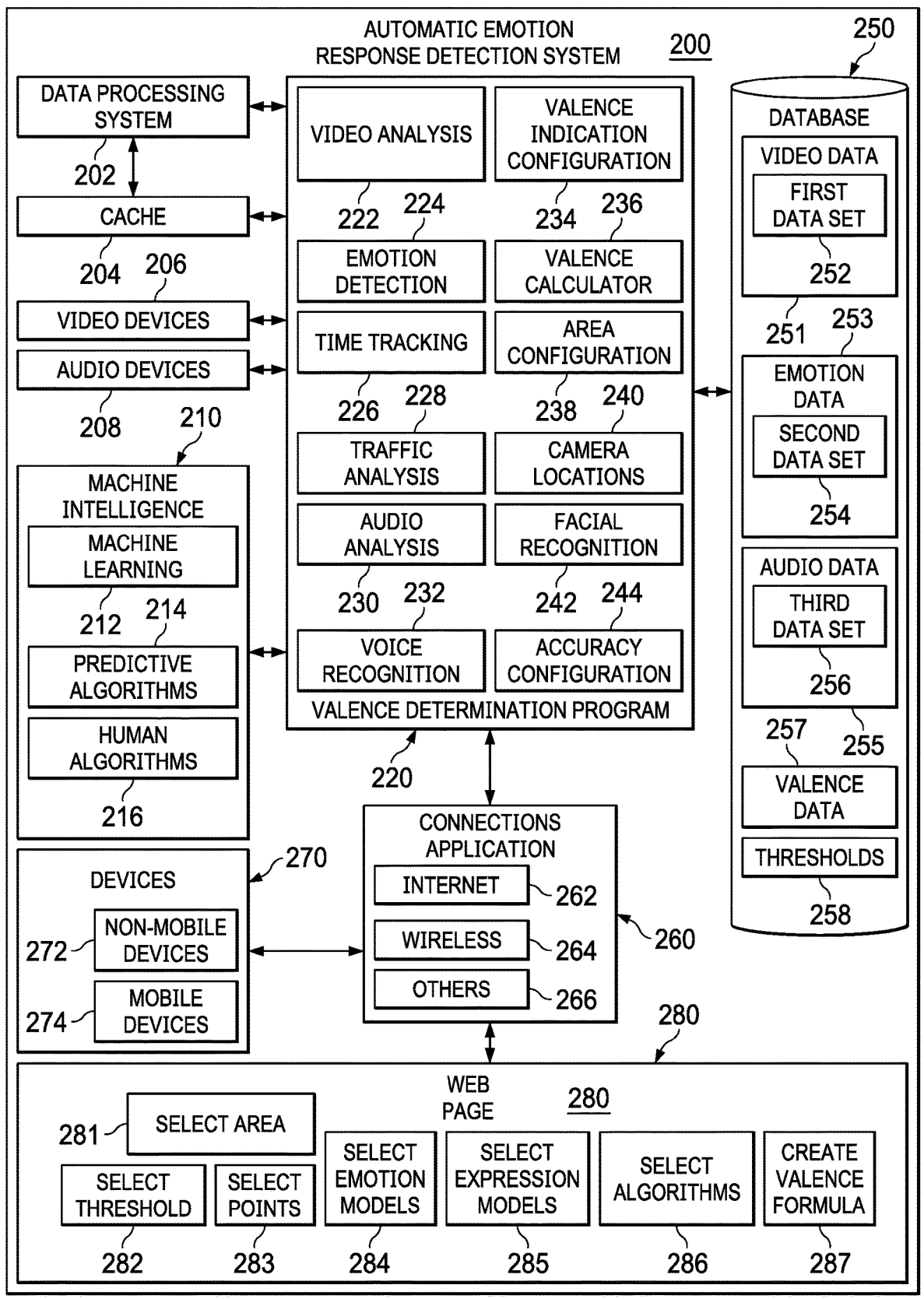
FIG. 2 is a block diagram of a computer system for determining a valence indication representing a human reaction to a particular area in accordance with an illustrative embodiment.

Turning to FIG. 2, a block diagram of an automatic emotion response detection system for determining a valence indication representing a human reaction to a particular area is depicted in accordance with an illustrative embodiment. Automatic emotion response detection system 200 comprises data processing system 202, cache 204, video devices 206, audio devices 208, valence determination program 220, database 250, connections application 260, devices 270, and web page 280. Database 250 comprises video data 251, audio data 255, emotion data 253, and valence data 257. Video devices 206 provided video data to video data 251 in database 250. Audio devices 208 provide audio data to audio data 255 in database 250. Video devices 206 and audio devices 208 may provide data to cache 204 for processing by data processing system 202.

Machine intelligence 210 comprises machine learning 212, predictive algorithms 214, and human algorithms 216. Machine intelligence 210 can be implemented using one or more systems such as an artificial intelligence system, a neural network, a Bayesian network, an expert system, a fuzzy logic system, a genetic algorithm, or other suitable types of systems. Machine intelligence 210 may analyze data from database 250 such as video data 251, emotion data 253, audio data 255, and valence data 257 to make recommendations on algorithms to select from algorithms 380 in valence support database 300 in FIG. 3. Moreover, machine intelligence 210 may train itself to identify behavior of individuals in a current video stream or both video and audio streams that may require immediate attention in real-time. Each of machine learning 212, predictive algorithms 214, and human algorithms 216 in FIG. 2 may be integrated with expression models 310, video emotion models 320, audio emotion models 350, and algorithms 380 in FIG. 3 and for application of use models 316 in FIG. 3.

Valence determination program 220 comprises a number of applications. The number of applications may include video analysis 222, emotion detection 224, time tracking 226, traffic analysis 228, audio analysis 230, voice recognition 232, valence indication configuration 234, valence calculator 236, area configuration 238, camera locations 240, facial recognition 242, and accuracy configuration 244.

Figure 6:
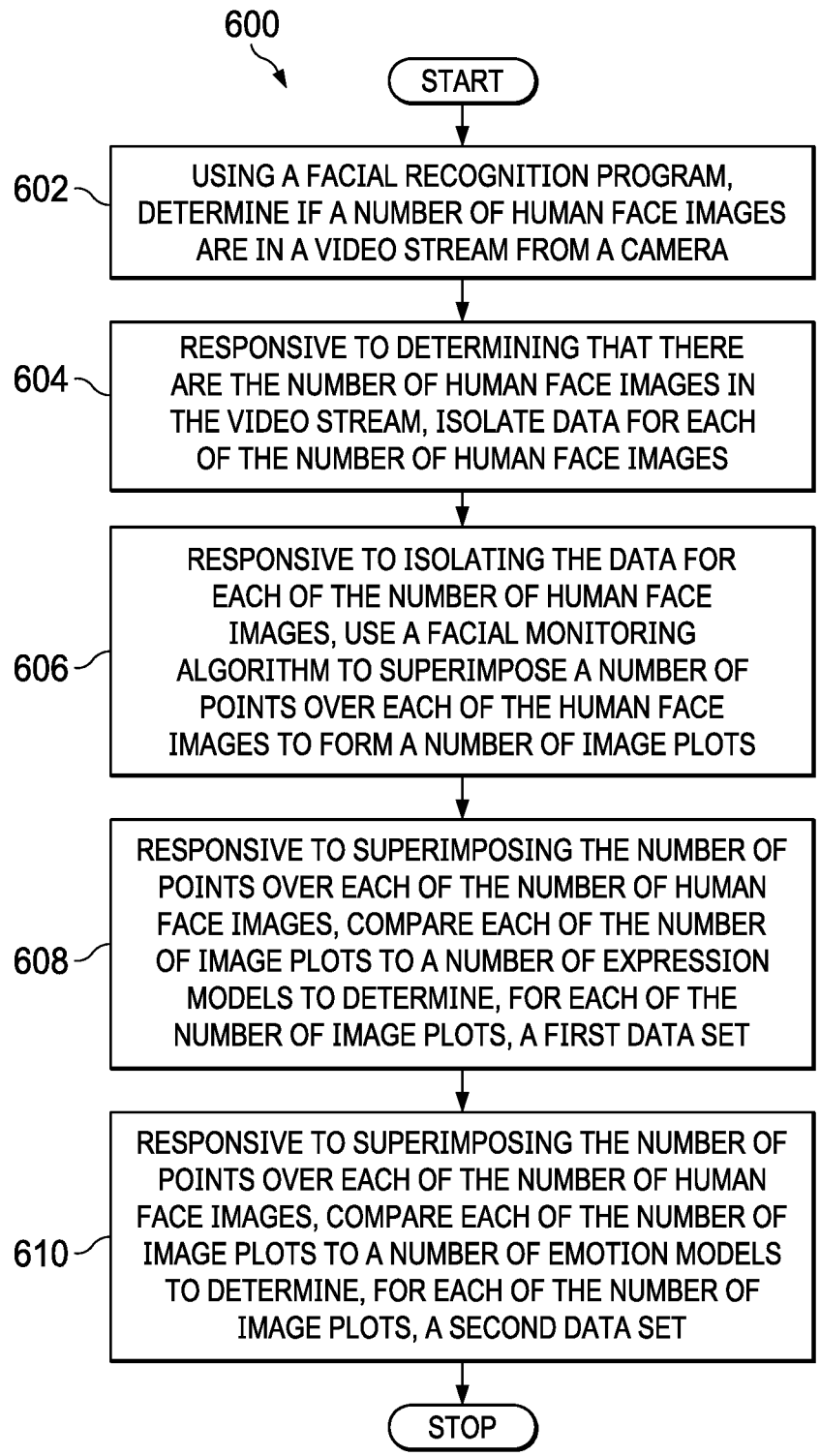
FIG. 6 is a flowchart of a process for retrieving a video stream from a camera in a particular area in a location in accordance with an illustrative embodiment.

Video analysis 222 may perform a process such as process 600 in FIG. 6. Video analysis 222 uses a facial recognition program, such as facial recognition 242, to determine if a number of human face images are in a video stream from a camera. The camera may be one of video devices 206. Responsive to determining that there are a number of human face images in the video stream, video analysis 222 isolates data for each of the number of human face images. Responsive to isolating the data for each of the number of human face images, video analysis 222 uses a facial monitoring algorithm to superimpose a number of points over each of the number of human face images to form a number of image plots. The facial monitoring algorithm may be one of two-dimensional facial monitoring 388 and three-dimensional facial monitoring 390 in FIG. 3.

Figure 3:
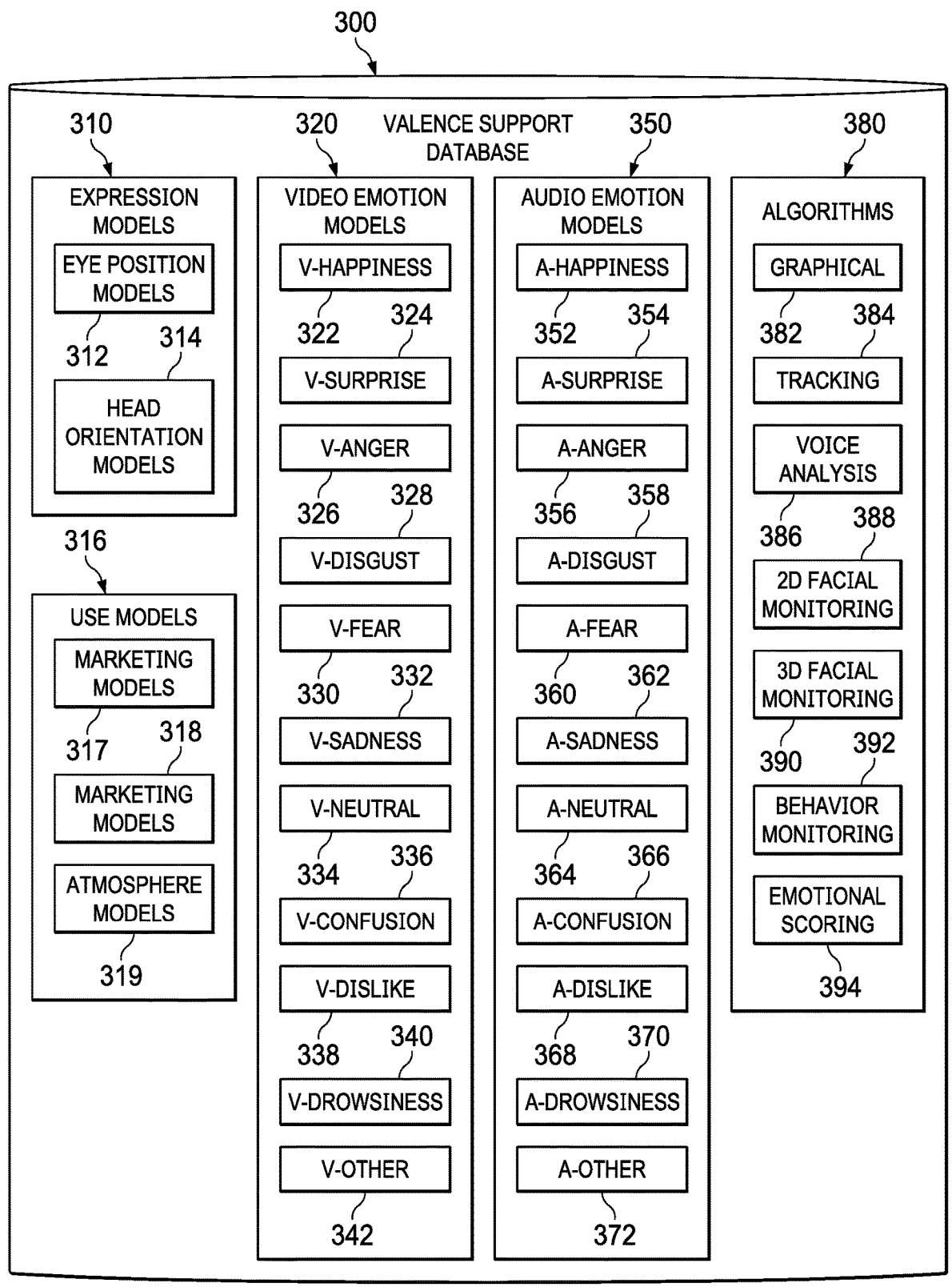
FIG. 3 is a block diagram of a valence support database in accordance with an illustrative embodiment.

Responsive to superimposing the number of points over each of the number of human face images, video analysis 222 compares each of the number of image plots to a number of expression models in expression models 310 in FIG. 3 to determine, for each of the number of image plots, a first data set. The first data set may be first data set 252 in video data 251 in FIG. 2. The first data set may be stored in cache 204 for immediate processing. The number of expression models may be one of eye position models 312 or head orientation models 314 in expression models 310 in FIG. 3.

Responsive to superimposing the number of points over each of the number of human face images, emotion detection 224 may perform a comparison of the number of image plots to a number of video emotion models to determine, for each of the number of image plots, a second data set. The video emotion models may be one or more of video emotion models 320 in FIG. 3. The second data set may be stored in emotion data 253 as second data set 254 in FIG. 2. The second data set may be stored in cache 204 for immediate processing.

Time tracking 226 may analyze changes in image plots over time. Traffic analysis 228 may record movement data of individuals moving about a location determined from video streams received from video devices such as video devices 206.

Figure 7:
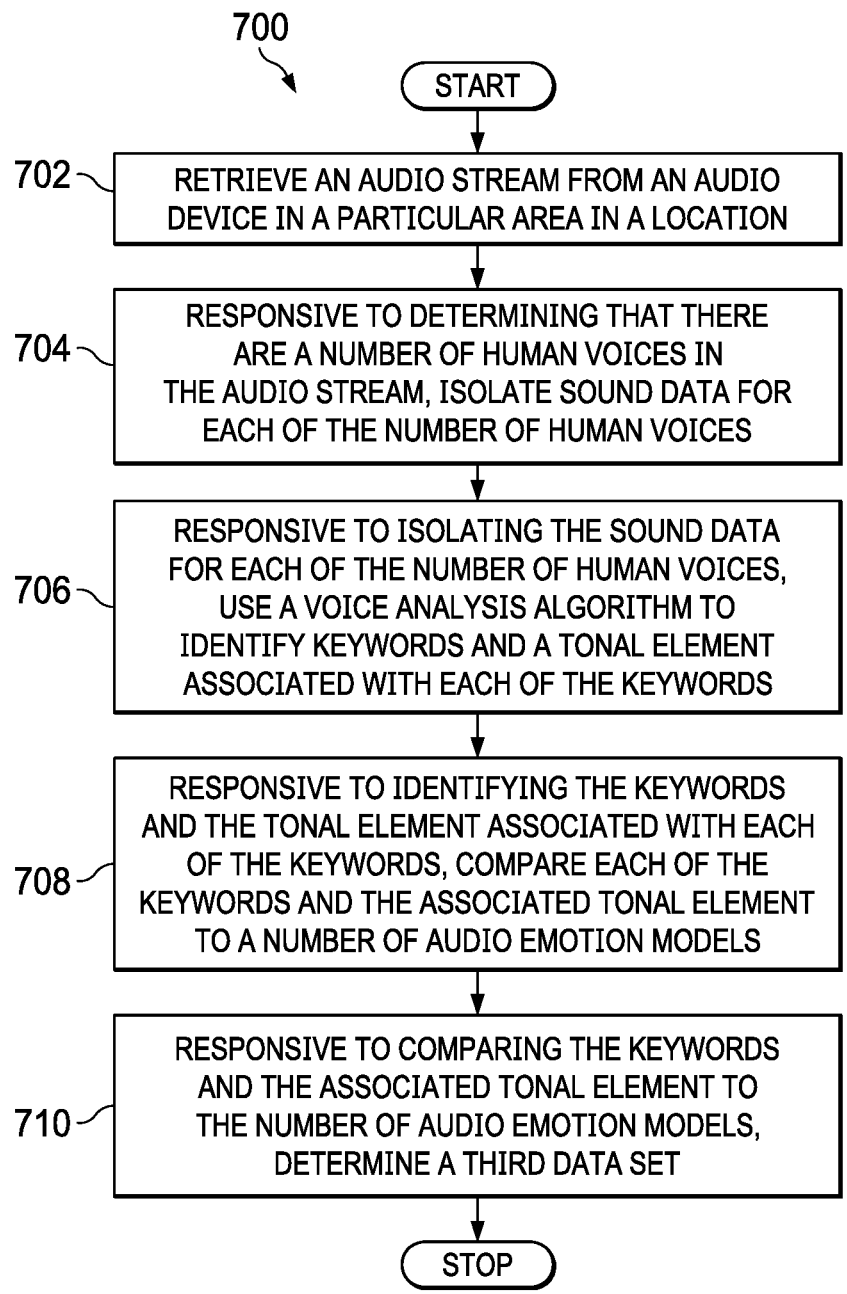
FIG. 7 is a flowchart of a process for retrieving an audio stream from an audio device in a particular area in a location in accordance with an illustrative embodiment.

Audio analysis 230 may perform audio analysis of an audio stream from audio devices 208 using process 700 in FIG. 7. Audio analysis 230 may retrieve an audio stream from an audio device in audio devices 208 in a particular area in a location. Audio analysis 230 may use voice recognition 232 to determine that there are a number of human voices in the audio stream. Responsive to determining that there are a number of human voices in the audio stream, audio analysis 230 may isolate sound data for each of the number of human voices. The sound data may be stored in cache 204 for immediate processing and may also be stored in audio data 255. Responsive to isolating the sound data for each of the number of human voices, audio analysis 230 may use a voice analysis algorithm to identify keywords and a tonal element associated with each of the keywords. The voice analysis algorithm may be voice analysis 386 in FIG. 3. Responsive to identifying the keywords and the tonal element associated with each of the keywords, audio analysis 230 may compare each of the keywords and an associated tonal element to a number of audio emotion models. The audio emotion models may be audio emotion models 350 in FIG. 3. Responsive to comparing the keywords and the associated tonal element to the number of audio emotion models, audio analysis 230 determines a third data set. The third data set may be third data set 256 stored in audio data 255 in FIG. 2. The third data set may be stored in cache 204 for immediate processing.

Voice recognition 232 may be used by audio analysis 230 to determine that there are a number of human voices in an audio stream received from audio devices 208. Valence indication configuration 234 may allow a user to configure a valence formula for calculation of a valence indication. Valence indication configuration 234 may use web page 280. Alternatively, another interface with automatic emotion response detection system 200 may be used that provides the same functionality as web page 280. Web page 280 comprises select area 281, select threshold 282, select points 283, select emotion models 284, select expression models 285, select algorithms 286, and create valence formula 287. Web page 280 allows a user to select area 281, select threshold 282, select points 283, select emotion models 284, select expression models 285, select algorithms 286, and create valence formula 287.

Valence calculator 236 forms a valence formula based upon the selections made by the user at web page 280. In an illustrative embodiment, a valence formula may be one of Formula 1 or Formula 2. Formula 1: valence indication (VI) equals score A (SA) plus score B (SB) or VI(1)=SA+SB. Formula 2: valence indication (VI) equals score A (SA) plus score B (SB) plus score C (SC) or VI(2)=SA+SB=SC. Score A is determined by applying emotional scoring 394 to a first data set. The first data set may be first data set 252 in video data 251 in FIG. 2. The first data set may be stored in cache 204 for immediate processing. Score B is determined by applying emotional scoring 394 to a second data set. The second data set may be stored in emotion data 253 as second data set 254 in FIG. 2. Score C is determined by applying emotional scoring 394 to a third data set. The third data set may be third data set 256 stored in audio data 255 in FIG. 2. The third data set may be stored in cache 204 for immediate processing. One of Formula 1 or Formula 2 may be formed in response to a selection of create valence formula 287 in web page 280. Process 700 in FIG. 7 may be used in forming Formula 1 or Formula 2. Select threshold 282 may be used to establish a threshold valence indication so that only valence indications indicating a certain level of emotion may be considered for further processing by use models 316 in FIG. 3 in process 900 in FIG. 9. Thresholds may be stored in thresholds 258 in FIG. 2.

Area configuration 238 allows a user to configure areas in a location in accordance with video devices 206 and audio devices 208. Camera locations 240 allow a user to identify camera locations and enter coordinates for camera locations. Camera angles may be used by video analysis 222 and facial recognition 242.

Connections application 260 comprises internet 262, wireless 264, and others 266. Devices 270 comprise non-mobile devices 272 and mobile devices 274.

As a result, automatic emotion response detection system 200 operates as a special purpose computer system for determining a valence indication representing a human reaction to a particular area in a location. Thus, automatic emotion response detection system 200 is a special purpose computer system as compared to currently available general computer systems that do not have a means to perform the functions of automatic emotion response detection system 200 of FIG. 2 described herein and as further described in FIGS. 2-10.

Moreover, currently used general computer systems do not provide a data processing system such as data processing system 202 configured by the processes in FIGS. 5-10. Moreover, currently used general computer systems do not provide for calculation of a valence indication using a valence determination program such as valence determination program 220 that analyzes data streams from one of a number of video devices and both video and audio devices.

Turning to FIG. 3, a block diagram of a valence support database is depicted in accordance with an illustrative embodiment. Expression models 310 may comprise eye position models 312 and head orientation models 314. Use models 316 may comprise marketing models 317, security models 318, and atmosphere models 319. Video emotion models 320 may comprise v-happiness 322, v-surprise 324, v-anger 326, v-disgust 328, v-fear 330, v-sadness 332, v-neutral 334, v-confusion 336, v-dislike 338, v-drowsiness 340, and v-other 342. Audio emotion models 350 may comprise a-happiness 352, a-surprise 354, a-anger 356, a-disgust 358, a-fear 360, a-sadness 362, a-neutral 364, a-confusion 366, a-dislike 368, a-drowsiness 370, and a-other 372. Algorithms 380 may comprise graphical 382, tracking 384, voice analysis 386, two-dimensional (2-D) facial monitoring 388, three-dimensional (3-D) facial monitoring 390, behavior monitoring 392, and emotional scoring 394. Behavior monitoring 392 may be used in conjunction with expression models 310. Emotional scoring 394 applies a score to emotions identified by a comparison of data to selected video emotion models in video emotion models 320 and may also score emotions identified by the comparison of data to selected audio emotions in audio emotion models 350. Scores generated by emotional scoring 394 may be used in calculating a valence value by valence calculator 236 in FIG. 2.

Figure 4:
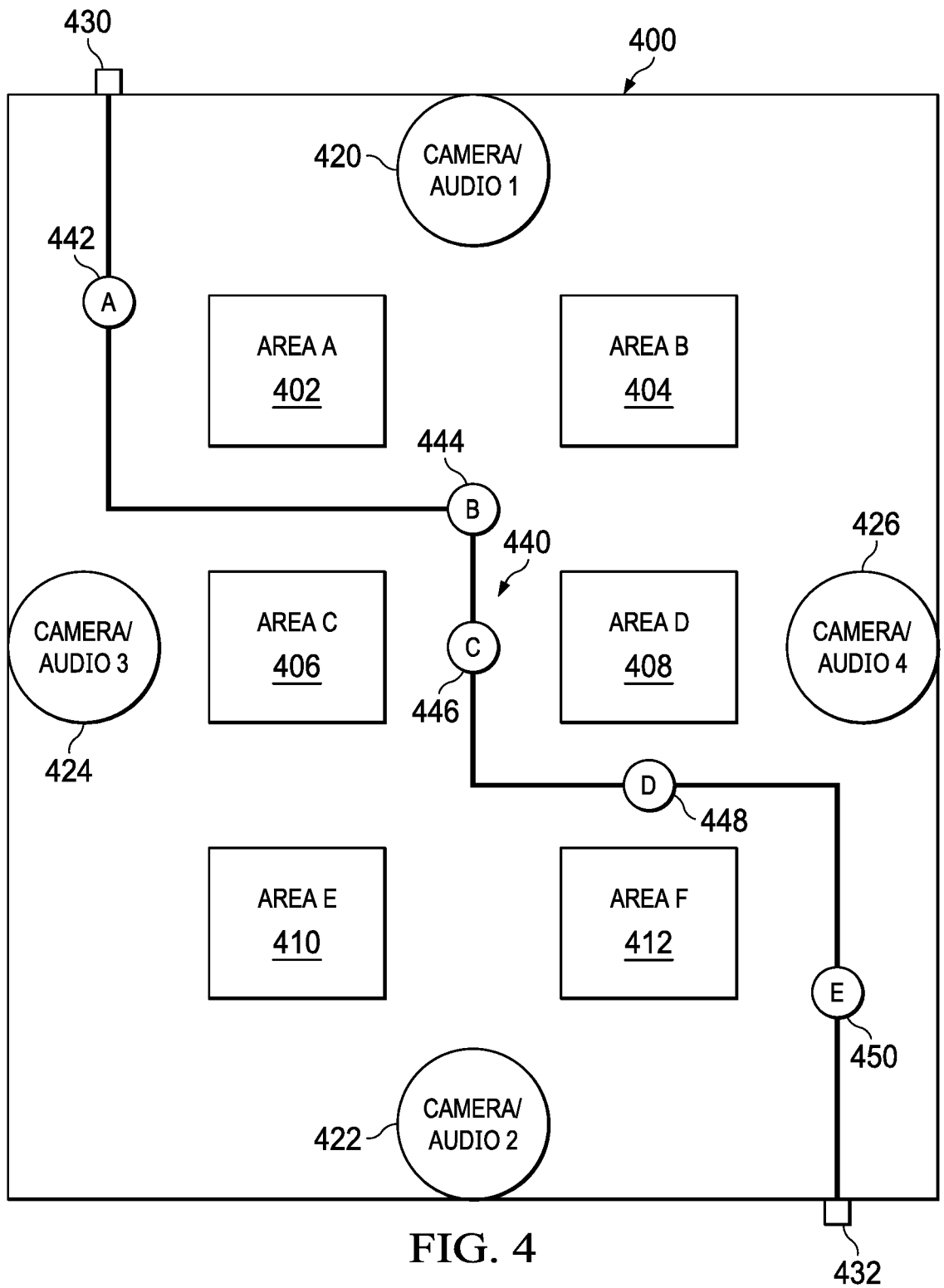
FIG. 4 is a schematic of a location in which a computer system for determining a valence indication representing a human reaction to areas in the location may be employed in accordance with an illustrative embodiment.

Turning to FIG. 4, a schematic of a location in which a computer system for determining a valence indication representing a human reaction to areas in the location may be employed is depicted in accordance with an illustrative embodiment. Location 400 comprises a number of areas in which automatic emotion response detection system 200 in FIG. 2 may be employed for determining a valence indication representing a human reaction to a particular area. The number of areas in the illustrative example may include area A 402, area B 404, area C 406, area D 408, area E 410, and area F 412. A number of cameras and audio devices are active in location 400. The number of cameras may include camera/audio 1 420, camera/audio 422, camera/audio 3 424, and camera/audio 4 426. Camera devices and audio devices may be employed together or separately. Location 400 may have entrance 430 and exit 432. An individual may traverse location 400 from entrance 430 along route 440 to exit 432. A number of positions are depicted along route 440 such as position A 442, position B 444, position C 446, position D 448, and position E 450. Thus, a valence indication may be calculated for the individual traversing route 440. Route 440 is by way of illustrative example and not by way of limitation. Persons skilled in the art recognize and take into account that an individual may take any number of routes through location 400. Moreover, any number of individuals may pass through location 400 and valence indications can be determined for each of the individuals.

Figure 5:
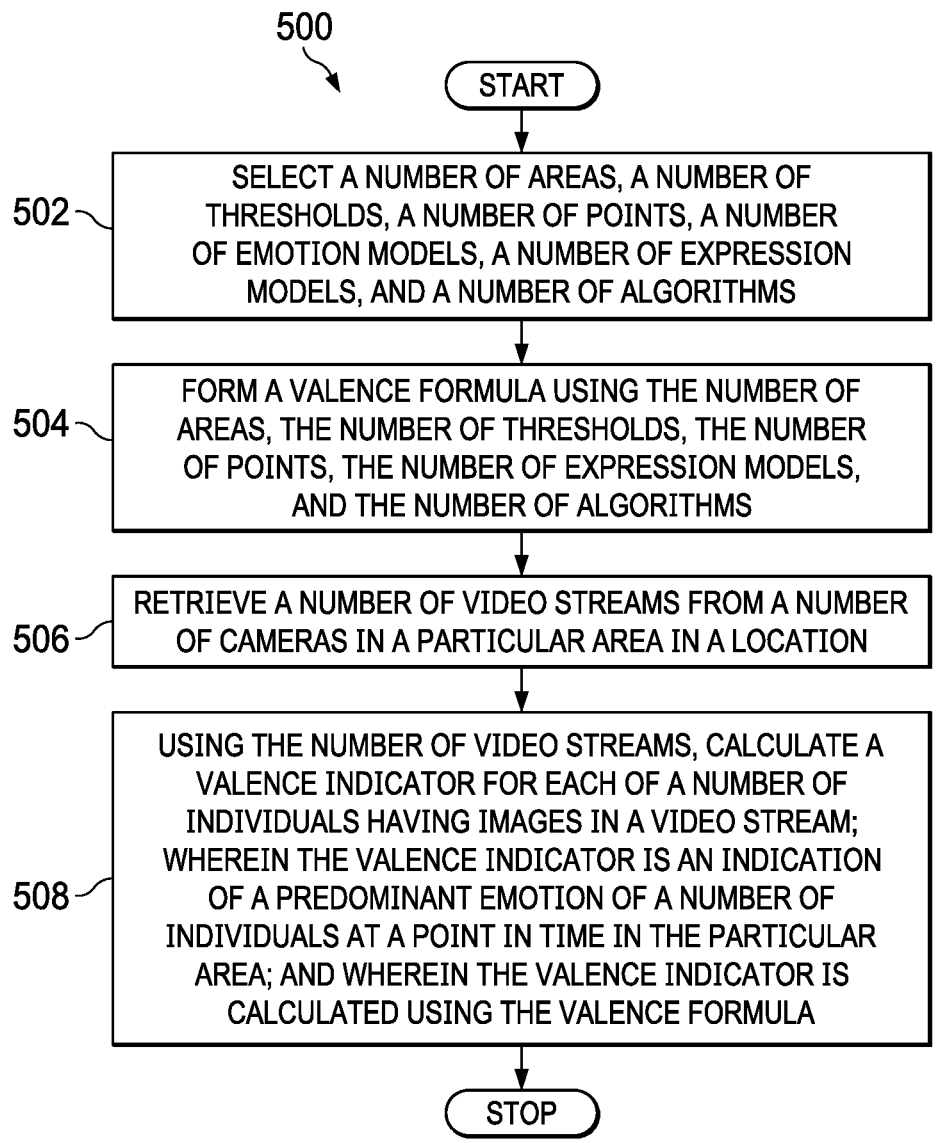
FIG. 5 is a flowchart of a process for determining a valence indication representing a human reaction to a particular area in a location in accordance with an illustrative embodiment.

Turning to FIG. 5, a flowchart of a process for determining a valence indication representing a human reaction to a particular area in a location is depicted in accordance with an illustrative embodiment. Process 500 can be implemented in software, hardware, or a combination of the two. When software is used, the software comprises program code that can be loaded from a storage device and run by a processor unit in a computer system such as automatic emotion response detection system 200 in FIG. 2. Automatic emotion response detection system 200 may reside in a network data processing system such as network data processing system 100 in FIG. 1. For example, automatic emotion response detection system 200 may reside on one or more of server computer 104, server computer 106, client computer 110, client computer 112, and client computer 114 connected by network 102 in FIG. 1. Moreover, process 500 can be implemented by data processing system 1000 in FIG. 10 and a processing unit such as processor unit 1004 in FIG. 10.

Process 500 starts. A number of areas, a number of thresholds, a number of points, a number of emotion models, a number of expression models, and a number of algorithms are selected (step 502). The number of areas may be selected at web page 280 using select zone 281 in FIG. 2. The number of thresholds may be selected at web page 280 using select threshold 282 in FIG. 2. The number of points may be selected at web page 280 using select points 283 in FIG. 2. The number of emotion models may be selected using select emotion models 284 in FIG. 2. The number of algorithms may be selected using web page 280 at select algorithms 286 in FIG. 2. The number of areas, the number of thresholds, the number of points, the number of emotion models, the number of expression models, and the number of algorithms, are used to form a valence formula (step 504). The valence formula may be selected by using create valence formula 287 at web page 280 in FIG. 2. A number of video streams from a number of cameras in a particular area in a location are retrieved (step 506). The number of cameras may be from video devices 206 in FIG. 2. The number of cameras may be one or more of camera/audio 1 420, camera/audio 2 422, camera/audio 3 424, and camera/audio 4 426 in FIG. 4. The number of video streams is used to calculate a valence indication for each of a number of individuals having images in the video stream (step 508). The valence indication represents a predominant emotion of an individual at a point in time in the particular area. The valence indication is calculated using the valence formula.

Turning to FIG. 6, a flowchart of a process for retrieving a video stream from a camera in a particular area in a location is depicted in accordance with an illustrative embodiment. Process 600 can be implemented in software, hardware, or a combination of the two. When software is used, the software comprises program code that can be loaded from a storage device and run by a processor unit in a computer system such as automatic emotion response detection system 200 in FIG. 2. Automatic emotion response detection system 200 may reside in a network data processing system such as network data processing system 100 in FIG. 1. For example, automatic emotion response detection system 200 may reside on one or more of server computer 104, server computer 106, client computer 110, client computer 112, and client computer 114 connected by network 102 in FIG. 1. Moreover, process 600 can be implemented by data processing system 1000 in FIG. 10 and a processing unit such as processor unit 1004 in FIG. 10.

Process 600 starts. A facial recognition program is used to determine if a number of human face images are in a video stream from a camera (step 602). The facial recognition program may be facial recognition 242 in FIG. 2. The camera may be from video devices 206 in FIG. 2. The camera may be one of camera/audio 1 420, camera/audio 2 422, camera/audio 3 424, and camera/audio 4 426 in FIG. 4. Responsive to determining that there are a number of human face images in the video stream, data for each of the number of human face images is isolated (step 604). Responsive to isolating the data for each of the number of human face images, a facial monitoring algorithm is used to superimpose a number of points over each of the number of human face images to form a number of image plots (step 606). The facial monitoring algorithm may be one of two-dimensional facial monitoring 388 and three-dimensional facial monitoring 390 in algorithms 380 in FIG. 3. Responsive to superimposing the number of points over each of the number of human face images, each of the number of image plots is compared to a number of expression models to determine, for each of the number of image plots, a first data set (step 608). The number of expression models may be one of eye position models 312 or head orientation models in expression models 310 in FIG. 3. Responsive to superimposing the number of points over each of the number of human face images, each of the number of image plots is compared to a number of video emotion models to determine, for each of the number of image plots, a second data set (step 610). The video emotion models may be one or more of video emotion models 320 in FIG. 3. Video analysis may use emotion detection 224 to perform the comparison and to determine the second data set. Process 600 ends.

Turning to FIG. 7, a flowchart of a process for retrieving an audio stream from an audio device in a particular area in a location is depicted in accordance with an illustrative embodiment. Process 700 can be implemented in software, hardware, or a combination of the two. When software is used, the software comprises program code that can be loaded from a storage device and run by a processor unit in a computer system such as automatic emotion response detection system 200 in FIG. 2. Automatic emotion response detection system 200 may reside in a network data processing system such as network data processing system 100 in FIG. 1. For example, automatic emotion response detection system 200 may reside on one or more of server computer 104, server computer 106, client computer 110, client computer 112, and client computer 114 connected by network 102 in FIG. 1. Moreover, process 700 can be implemented by data processing system 1000 in FIG. 10 and a processing unit such as processor unit 1004 in FIG. 10.

Process 700 begins. An audio stream is retrieved from an audio device in a particular area in a location (step 702). Audio analysis 230 may retrieve an audio stream from an audio device in audio devices 208 in FIG. 2 in the particular area in the location. The audio device may be one of camera/audio 1 420, camera/audio 2 422, camera/audio 3 424, and camera/audio 4 426 in FIG. 4. Audio analysis 230 may use voice recognition 232 in FIG. 2 to determine that there are a number of human voices in the audio stream. Responsive to determining that there are the number of human voices in the audio stream, sound data for each of the number of human voices is isolated (step 704). The sound data may be stored in cache 204 for immediate processing and may also be stored in audio data 255 in FIG. 2. Responsive to isolating the sound data for each of the number of human voices, a voice analysis algorithm is used to identify keywords and a tonal element associated with each of the keywords (step 706). The voice analysis algorithm may be voice analysis 386 in FIG. 3. Responsive to identifying the keywords and the tonal element associated with each of the keywords, each of the keywords and an associated tonal element is compared to a number of audio emotion models (step 708). The audio emotion models may be audio emotion models 350 in FIG. 3. Responsive to comparing the keywords and the associated tonal element to the number of audio emotion models, a third data set is determined (step 710). The third data set may be stored in cache 204 for immediate processing and may also be stored in audio data 255 in FIG. 2. Process 700 ends.

Figure 8:
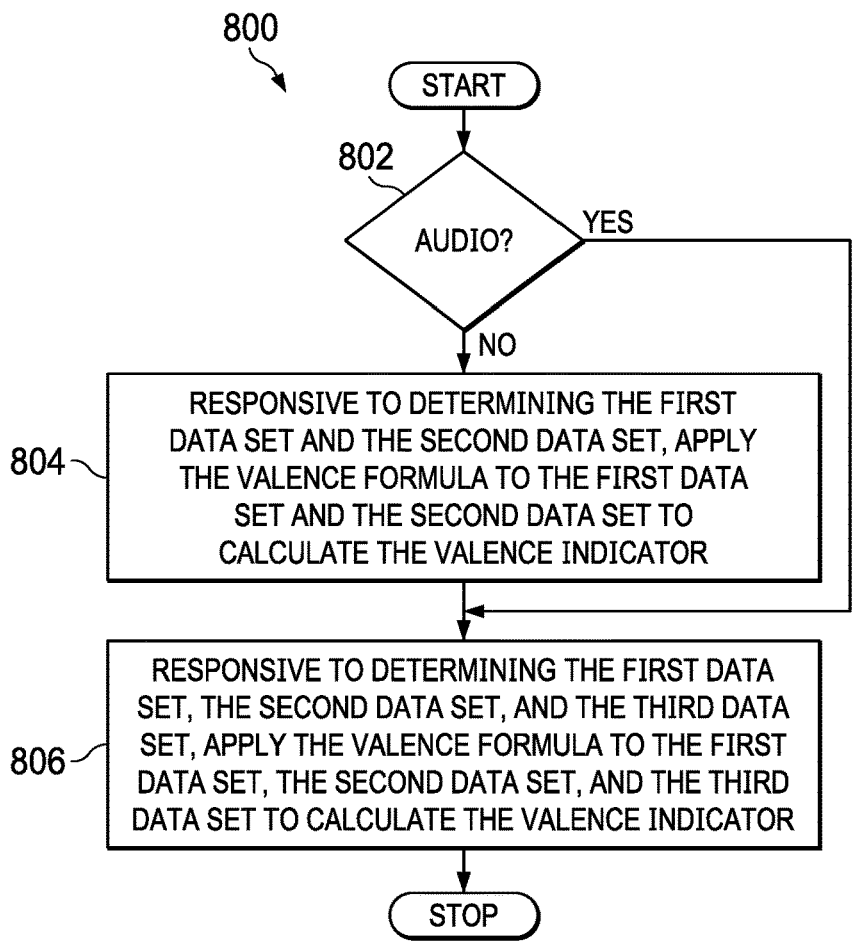
FIG. 8 is a flowchart of a process for determining whether to use a first data set and a second data set or to use a first data set, a second data set, and a third data set in accordance with an illustrative embodiment.

Turning to FIG. 8, a flowchart of a process for determining whether to use a first data set and a second set or a first data set, a second data set, and a third data is depicted in accordance with an illustrative embodiment. Process 800 can be implemented in software, hardware, or a combination of the two. When software is used, the software comprises program code that can be loaded from a storage device and run by a processor unit in a computer system such as automatic emotion response detection system 200 in FIG. 2. Automatic emotion response detection system 200 may reside in a network data processing system such as network data processing system 100 in FIG. 1. For example, automatic emotion response detection system 200 may reside on one or more of server computer 104, server computer 106, client computer 110, client computer 112, and client computer 114 connected by network 102 in FIG. 1. Moreover, process 800 can be implemented by data processing system 1000 in FIG. 10 and a processing unit such as processor unit 1004 in FIG. 10.

Process 800 begins. A determination is made as to whether audio is to be incorporated into calculations of valence indications (step 802). If a determination is made not to use audio, process 800 goes to step 804. Responsive to determining a first data set and a second data set, the valence formula is applied to the first data set and the second data set to calculate the valence indication (step 804). If at step 802 a determination is made to incorporate the audio data into the calculation of the valence indication, then process 800 goes to step 806. Responsive to determining the first data set, the second data set, and the third data set, the valence formula is applied to the first data set, the second data set, and the third data set to calculate the valence indication (step 806). Process 800 ends.

Figure 9:
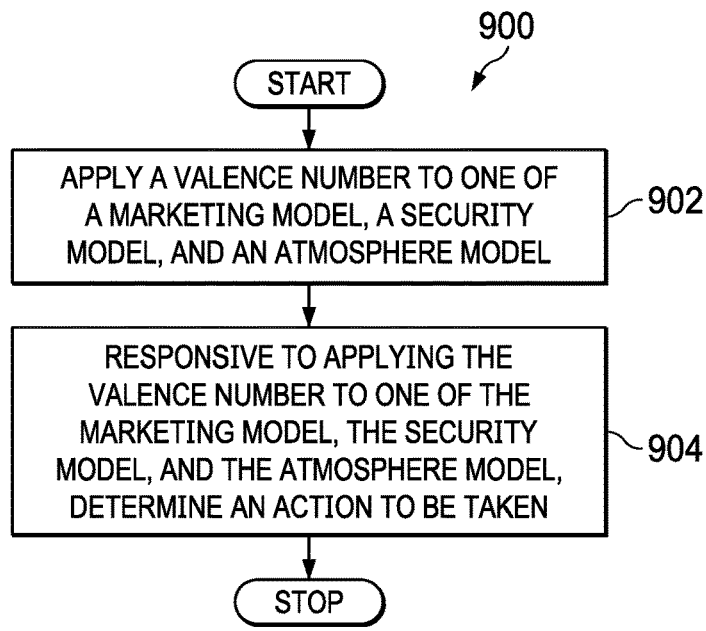
FIG. 9 is a flowchart of a process for applying a use model to a valence indication in accordance with an illustrative embodiment.
Figure 10:
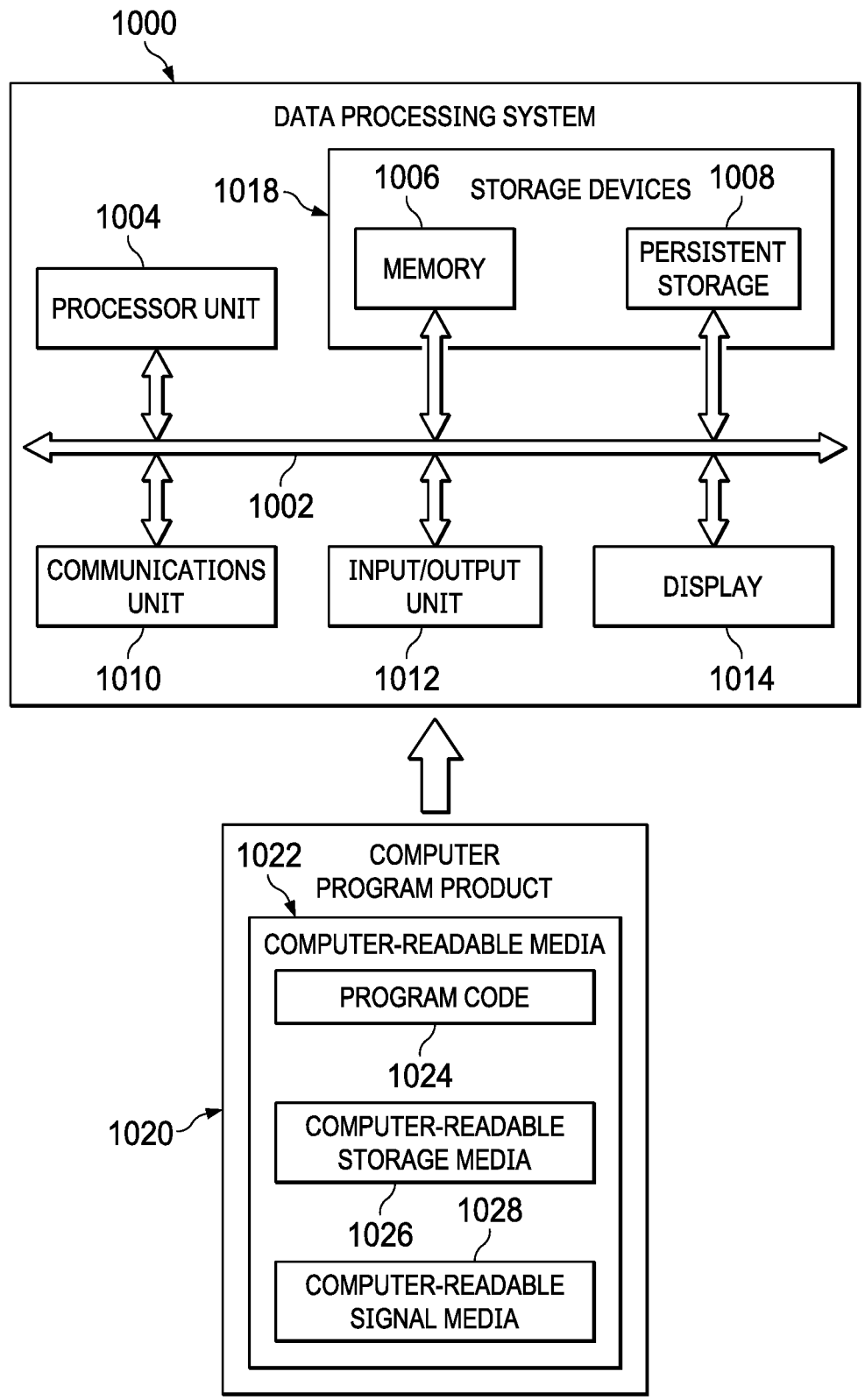
FIG. 10 is a block diagram of a data processing system depicted in accordance with an illustrative embodiment.

Turning to FIG. 9, a flowchart of a process for applying a use model to a valence indication is depicted in accordance with an illustrative embodiment. Process 900 can be implemented in software, hardware, or a combination of the two. When software is used, the software comprises program code that can be loaded from a storage device and run by a processor unit in a computer system such as automatic emotion response detection system 200 in FIG. 2. Automatic emotion response detection system 200 may reside in a network data processing system such as network data processing system 100 in FIG. 1. For example, automatic emotion response detection system 200 may reside on one or more of server computer 104, server computer 106, client computer 110, client computer 112, and client computer 114 connected by network 102 in FIG. 1. Moreover, process 900 can be implemented by data processing system 1000 in FIG. 10 and a processing unit such as processor unit 1004 in FIG. 10.

Process 900 begins. A valence indication is applied to one of a marketing model, a security model, and an atmosphere model (step 902). Responsive to applying the valence indication to one of the marketing model, the security model, and the atmosphere model, an action to be taken is determined (step 904). The marketing model may be one of marketing models 317 in FIG. 3. The security model may be one of security models 318 in FIG. 3. The atmosphere model may be one of atmosphere models 319 in FIG. 3. Process 900 ends.

Turning now to FIG. 10, a block diagram of a data processing system is depicted in accordance with an illustrative embodiment. Data processing system 1000 may be used to implement one or more computers such as computer 110, client computer 112, and client computer 114 in FIG. 1. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1024 is located in a functional form on computer-readable media 1022 that is selectively removable and may be loaded onto or transferred to data processing system 1000 for execution by processor unit 1004. Program code 1024 and computer-readable media 1022 form computer program product 1020 in these illustrative examples. In one example, computer-readable media 1022 may be computer-readable storage media 1026 or computer-readable signal media 1028.

In these illustrative examples, computer-readable storage media 1026 is a physical or tangible storage device used to store program code 1024 rather than a medium that propagates or transmits program code 1024. Alternatively, program code 1024 may be transferred to data processing system 1200 using computer-readable signal media 1028.

Computer-readable signal media 1028 may be, for example, a propagated data signal containing program code 1024. For example, computer-readable signal media 1028 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1024.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for determining a valence indication representing a human reaction to a particular area in a location, the computer-implemented method comprising:
   selecting a number of areas in the location, a number of thresholds, a number of points, a number of emotion models, a number of expression models, a number of algorithms;
   using the number of areas, the number of thresholds, the number of points, the number of emotion models, the number of expression models, and the number of algorithms, forming a valence formula;
   retrieving a number of video streams from a number of cameras in the particular area in the location; and
   using the number of video streams, calculating a valence indication for each of a number of individuals having images in the number of video streams, wherein the valence indication represents a predominant emotion of an individual at a point in time in the particular area, and wherein the valence indication is calculated using the valence formula.

2. The computer-implemented method of claim 1, wherein retrieving a video stream from a camera in the particular area in the location further comprises:
   using a facial recognition program to determine if a number of human face images are in a video stream from the camera;
   responsive to determining that there are a number of human face images in the video stream, isolating data for each of the number of human face images;
   responsive to isolating the data for each of the number of human face images, using a facial monitoring algorithm to superimpose a number of points over each of the number of human face images to form a number of image plots;
   responsive to superimposing the number of points over each of the number of human face images, comparing each of the number of image plots to a number of expression models to determine, for each of the number of image plots, a first data set; and
   responsive to superimposing the number of points over each of the number of human face images, comparing each of the number of image plots to a number of video emotion models to determine, for each of the number of image plots, a second data set.

3. The computer-implemented method of claim 2, further comprising:
   retrieving an audio stream from an audio device in the particular area in the location;
   responsive to determining that there are a number of human voices in the audio stream, isolating sound data for each of the number of human voices;
   responsive to isolating the sound data for each of the number of human voices, using a voice analysis algorithm to identify key words and a tonal element associated with each of the key words;
   responsive to identifying the key words and the tonal element associated with each of the key words, comparing each of the key words and an associated tonal element to a number of audio emotion models; and
   responsive to comparing the key words and the associated tonal element to the number of audio emotion models, determining a third data set.

4. The computer-implemented method of claim 2, further comprising:
   responsive to determining the first data set and the second data set, applying the valence formula to the first data set and the second data set to calculate the valence indication.

5. The computer-implemented method of claim 3, further comprising:
   responsive to determining the first data set, the second data set, and the third data set, applying the valence formula to the first data set, the second data set, and the third data set to calculate the valence indication.

6. The computer-implemented method of claim 2, wherein the facial monitoring algorithm is a two-dimensional facial monitoring algorithm.

7. The computer-implemented method of claim 2, wherein the facial monitoring algorithm is a three-dimensional facial monitoring algorithm.

8. The computer-implemented method of claim 2, wherein the number of expression models are selected from one or both of eye position models and head orientation models.

9. The computer-implemented method of claim 2, wherein the number of video emotion models is selected from a list consisting of happiness, surprise, anger, disgust, fear, sadness, neutral, confusion, dislike, and drowsiness.

10. The computer-implemented method of claim 3, further comprising:
    applying the valence indication to one of a marketing model, a security model, and an atmosphere model; and
    responsive to applying the valence indication to one of the marketing model, the security model, and the atmosphere model, determining an action to be taken.

11. A computer system for determining a valence indication representing a human reaction to a particular area in a location, the computer system comprising:
    a storage device configured to store program instructions; and
    one or more processors operably connected to the storage device and configured to execute the program instructions to cause the computer system to:
    select a number of areas in the location, a number of thresholds, a number of points, a number of emotion models, a number of expression models, a number of algorithms;

use the number of areas, the number of thresholds, the number of points, the number of emotion models, the number of expression models, and the number of algorithms, to form a valence formula;

retrieve a number of video streams from a number of cameras in the particular area in the location;

use the number of video streams to calculate a valence indication for each of a number of individuals having images in the number of video streams wherein the valence indication represents a predominant emotion of a number of individuals at a point in time in the particular area, and wherein the valence indication is calculated using the valence formula.

12. The apparatus of claim 11, wherein the processors further execute instructions to cause the system to:

use a facial recognition program to determine if a number of human face images are in a video stream from a camera; responsive to determining that there are a number of human face images in the video stream, isolate data for each of the number of human face images; responsive to isolating the data for each of the number of human face images, use a facial monitoring algorithm to superimpose a number of points over each of the number of human face images to form a number of image plots; and responsive to superimposing the number of points over each of the number of human face images, compare each of the number of image plots to a number of expression models to determine, for each of the number of image plots, a first data set; and responsive to superimposing the number of points over each of the number of human face images, compare each of the number of image plots to a number of emotion models to determine, for each of the number of image plots, a second data set.

13. The apparatus of claim 12, wherein the processors further execute instructions to cause the system to:

retrieve an audio stream from an audio device in the particular area in the location; responsive to determining that there are a number of human voices in the audio stream, isolate sound data for each of the number of human voices; responsive to isolating the sound data for each of the number of human voices, use a voice analysis algorithm to identify key words and a tonal element associated with each of the key words; and responsive to identifying the key words and the tonal element associated with each of the key words, compare each of the key words and an associated tonal element to a number of audio emotion models; and responsive to comparing the key words and the associated tonal element to the number of audio emotion models, determine a third data set.

14. The apparatus of claim 13, wherein the processors further execute instructions to cause the system to:

responsive to determining the first data set and the second data set, apply the valence formula to the first data set and the second data set to calculate the valence indication.

15. The apparatus of claim 13, wherein the processors further execute instructions to cause the system to:

responsive to determining the first data set, the second data set, and the third data set, apply the valence formula to the first data set, the second data set, and the third data set to calculate the valence indication.

16. A computer program product for determining a valence indication representing a human reaction to a particular area in a location, the computer program product comprising:

a non-transitory computer-readable storage medium having program instructions embodied thereon, the program instructions executable by a number of processors to:

select a number of areas in the location, a number of thresholds, a number of points, a number of emotion models, a number of expression models, a number of algorithms;

use the number of areas, the number of thresholds, the number of points, the number of emotion models, the number of expression models, and the number of algorithms, to form a valence formula;

retrieve a number of video streams from a number of cameras in the particular area in the location;

use the number of video streams to calculate a valence indication for each of a number of individuals having images in the number of video streams; and wherein the valence indication represents a predominant emotion of an individual at a point in time in the particular area; and wherein the valence indication is calculated using the valence formula.

17. The computer program product of claim 16, further comprising instructions for:

using a facial recognition program to determine if a number of human face images are in a video stream from a camera; responsive to determining that there are a number of human face images in the video stream, isolating the data for each of the number of human face images; responsive to isolating data for each of the number of human face images, using a facial monitoring algorithm to superimpose a number of points over each of the number of human face images to form a number of image plots; and responsive to superimposing the number of points over each of the number of human face images, comparing each of the number of image plots to a number of expression models to determine, for each of the number of image plots, a first data set; and responsive to superimposing the number of points over each of the number of human face images, comparing each of the number of image plots to a number of emotion models to determine, for each of the number of image plots, a second data set.

18. The computer program product of claim 17, further comprising instructions for:

responsive to determining the valence indication of one or more emotions, retrieving an audio stream from an audio device in the particular area in the location; responsive to determining that there are a number of human voices in the audio stream, isolate sound data for each of the number of human voices; responsive to isolating the sound data for each of the number of human voices, use a voice analysis algorithm to identify key words and a tonal element associated with each of the key words; and responsive to identifying the key words and the tonal element associated with each of the key words, compare each of the key words and an associated tonal element to a number of audio emotion models; and responsive to comparing the key words and the associated tonal element to the number of audio emotion models, determine a third data set.

19. The computer program product of claim 18, further comprising instructions for:

responsive to determining the first data set, the second data set, and the third data set, applying the valence formula to the first data set, the second data set, and the third data set to calculate the valence indication.

20. The computer program product of claim 19, further comprising instructions for:
applying the valence indication to one of a marketing model, a security model, and an atmosphere model; and responsive to applying the valence indication to one of the marketing model, the security model, and the atmosphere model, to determine an action to be taken.

\* \* \* \* \*